United States Patent
Cuthbert et al.

(10) Patent No.: US 9,514,377 B2
(45) Date of Patent: *Dec. 6, 2016

(54) TECHNIQUES FOR DISTRIBUTED OPTICAL CHARACTER RECOGNITION AND DISTRIBUTED MACHINE LANGUAGE TRANSLATION

(71) Applicant: Google Inc., Mountain View, CA (US)

(72) Inventors: Alexander Jay Cuthbert, Oakland, CA (US); Peng Xu, San Jose, CA (US)

(73) Assignee: Google Inc., Mountain View, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 14/264,327

(22) Filed: Apr. 29, 2014

(65) Prior Publication Data
US 2015/0310291 A1    Oct. 29, 2015

(51) Int. Cl.
*G06K 9/00* (2006.01)
*G06K 9/18* (2006.01)
*G06K 9/22* (2006.01)
*G06K 9/32* (2006.01)

(52) U.S. Cl.
CPC . *G06K 9/18* (2013.01); *G06K 9/22* (2013.01); *G06K 9/325* (2013.01)

(58) Field of Classification Search
CPC .................................................. G06K 9/18
USPC ........................................................ 382/182
See application file for complete search history.

(56) References Cited

U.S. PATENT DOCUMENTS

| | | | |
|---|---|---|---|
| 5,546,538 A | 8/1996 | Cobbley et al. | |
| 5,848,386 A * | 12/1998 | Motoyama | 704/5 |
| 6,285,978 B1 * | 9/2001 | Bernth et al. | 704/7 |
| 6,567,547 B1 * | 5/2003 | Roman | 382/181 |
| 8,131,536 B2 * | 3/2012 | Weischedel et al. | 704/5 |
| 8,218,020 B2 * | 7/2012 | Tenchio et al. | 348/211.3 |
| 8,508,787 B2 * | 8/2013 | Minhas | 358/1.18 |
| 8,625,113 B2 * | 1/2014 | Keys et al. | 358/1.11 |

(Continued)

OTHER PUBLICATIONS

PCT International Search Report and Written Opinion dated Sep. 28, 2015 for PCT International Application PCT/US2015/027884, 15 pages.

(Continued)

*Primary Examiner* — Kim Vu
*Assistant Examiner* — Molly Delaney
(74) *Attorney, Agent, or Firm* — Remarck Law Group PLC

(57) ABSTRACT

A technique for selectively distributing OCR and/or machine language translation tasks between a mobile computing device and server(s) includes receiving, at the mobile computing device, an image of an object comprising a text. The mobile computing device can determine a degree of optical character recognition (OCR) complexity for obtaining the text from the image. Based on this degree of OCR complexity, the mobile computing device and/or the server(s) can perform OCR to obtain an OCR text. The mobile computing device can then determine a degree of translation complexity for translating the OCR text from its source language to a target language. Based on this degree of translation complexity, the mobile computing device and/or the server(s) can perform machine language translation of the OCR text from the source language to a target language to obtain a translated OCR text. The mobile computing device can then output the translated OCR text.

27 Claims, 5 Drawing Sheets

(56) References Cited

U.S. PATENT DOCUMENTS

| | | | |
|---|---|---|---|
| 8,983,190 B2* | 3/2015 | Katsaros et al. | 382/182 |
| 2003/0200078 A1 | 10/2003 | Luo et al. | |
| 2006/0181605 A1 | 8/2006 | Boncyk et al. | |
| 2006/0245005 A1* | 11/2006 | Hall et al. | 358/448 |
| 2008/0118162 A1* | 5/2008 | Siegemund | 382/229 |
| 2008/0262828 A1* | 10/2008 | Och et al. | 704/3 |
| 2011/0123115 A1* | 5/2011 | Lee et al. | 382/185 |
| 2012/0075648 A1 | 3/2012 | Keys et al. | |
| 2012/0330646 A1 | 12/2012 | Andrade et al. | |
| 2013/0114849 A1 | 5/2013 | Pengelly et al. | |
| 2013/0289971 A1 | 10/2013 | Parkinson et al. | |

OTHER PUBLICATIONS

International Search Report and Written Opinion for International Application No. PCT/US2015/027873 mailed Jul. 20, 2015, 11 pages.

Partial International Search Report for International Application No. PCT/US2015/027884 mailed Jul. 16, 2015, 5 pages.

Zhang, Mi et al.: "OCRdroid: A Framework to Digitize Text Using Mobile Phones" In:g "Mobile Computing, Applications, and Services", Jan. 1, 2010, Springer Berlin Heidelberg, Berlin, Heidelberg, XP055177757, ISBN: 978-3-64-212606-2 vol. 35, pp. 273-292.

Berclaz, Jerome et al.: "Image-based mobile service: automatic text extraction and translation", Proceedings of SPIE, vol. 7542, Jan. 27, 2010, 12 pages, XP055200900, ISSN: 0277-786X.

Hsueh, Michael: "Interactive Text Recognition and Translation on a Mobile Device", Electrical Engineering and Computer Sciences, University of California at Berkeley, Technical Report No. UCB/EECS-2011-57, May 13, 2011, pp. 1-13, XP055052714, Retrieved from the Internet: URL: http://www.eecs.berkeley.edu/Pubs/TechRpts/2011/EECS-2011-57.pdf.

Fragoso, Victor et al.: "TranslatAR: A mobile augmented reality translator", Applications of Computer Vision (WACV), 2011 IEEE Workshop ON, IEEE, Jan. 5, 2011, pp. 497-502, XP031913615.

* cited by examiner

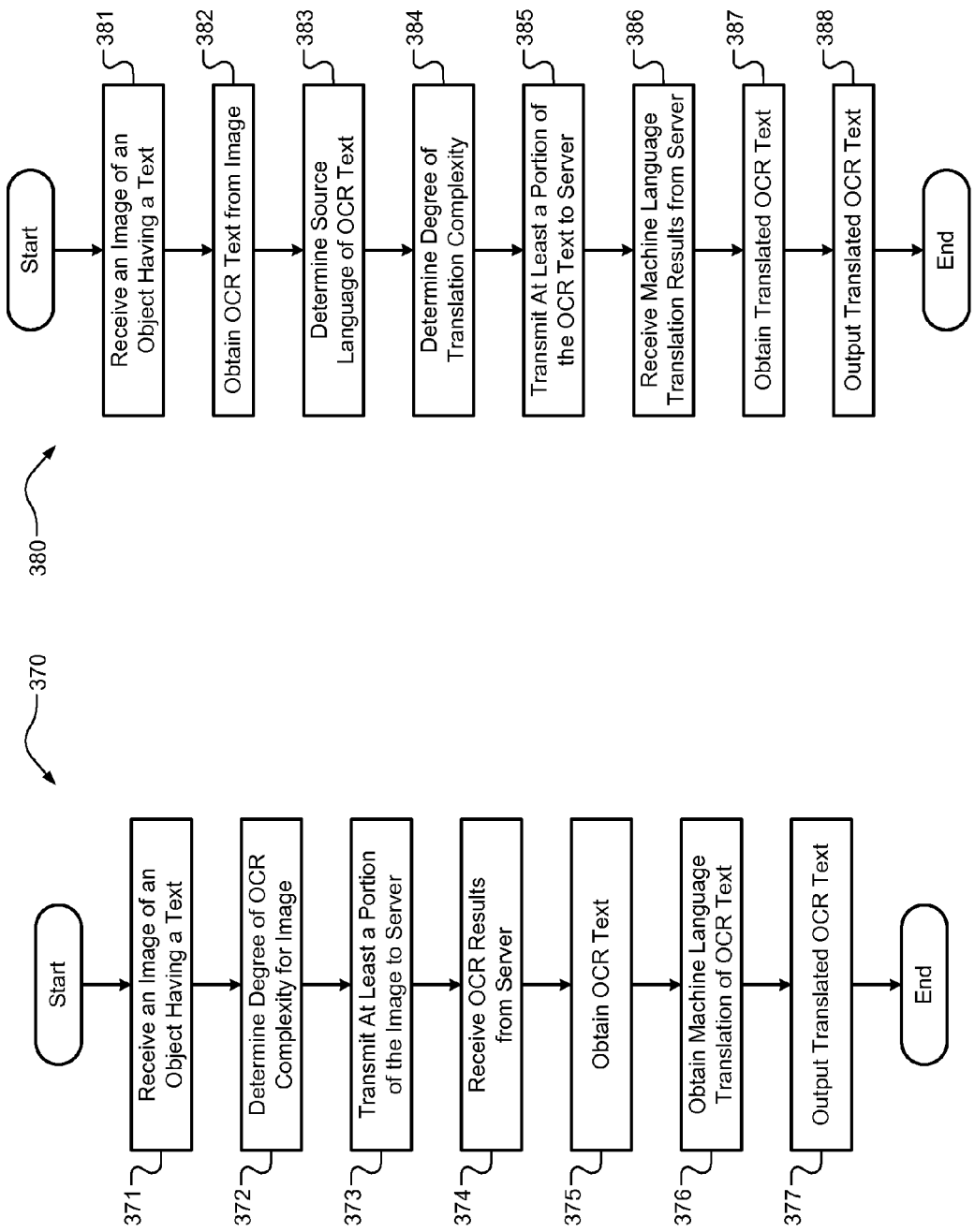

TECHNIQUES FOR DISTRIBUTED OPTICAL CHARACTER RECOGNITION AND DISTRIBUTED MACHINE LANGUAGE TRANSLATION

FIELD

The present disclosure generally relates to mobile computing devices and, more particularly, to techniques for distributed optical character recognition (OCR) and distributed machine language translation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Optical character recognition (OCR) involves the detection of a text in an image using a computing device, e.g., a server. OCR can provide for a faster way to obtain the text in a digital form at a user device, e.g., compared to manual input of the text to the user device by a user. After obtaining the text in the image, the text can be utilized in various ways. For example, the text may be processed by a computing device, stored at a memory, and/or transmitted to another computing device. One example of processing the text is machine language translation, which involves translating the text from a source language to a different target language using a computing device.

SUMMARY

A computer-implemented technique is presented. The technique can include receiving, at a mobile computing device having one or more processors, an image of an object comprising a text in a source language. The technique can include determining, at the mobile computing device, a degree of optical character recognition (OCR) complexity for performing OCR on the image to obtain the text. When the degree of OCR complexity is less than a first OCR complexity threshold the first OCR complexity threshold representing a degree of OCR complexity that the mobile computing device is appropriate for performing, the technique can include performing, at the mobile computing device, OCR on the image to obtain an OCR text. When the degree of OCR complexity is greater than the first OCR complexity threshold, the technique can include: (i) transmitting, from the mobile computing device, at least a portion of the image to a first server, and (ii) receiving, at the mobile computing device at least a portion of the OCR text from the first server. The technique can include determining, at the mobile computing device, a degree of translation complexity for translating the OCR text from the source language to a target language. When the degree of translation complexity is less than a first translation complexity threshold the first OCR complexity threshold representing a degree of translation complexity that the mobile computing device is appropriate for performing, the technique can include performing, at the mobile computing device, machine language translation of the OCR text from the source language to a target language to obtain a translated OCR text in the target language. When the degree of translation complexity is greater than the first translation complexity threshold, the technique can include: (i) transmitting at least a portion of the OCR text to a second server, and (ii) receiving at least a portion of the translated OCR text from the second server. The technique can also include outputting, at a display of the mobile computing device, the translated OCR text.

In some embodiments, when the degree of OCR complexity is greater than the first OCR complexity threshold and less than a second OCR complexity threshold, the technique can include: transmitting, from the mobile computing device, at least the portion of the image to the first server, and receiving, at the mobile computing device, at least the portion of the OCR text from the first server.

In other embodiments, the second OCR complexity threshold represents a degree of OCR complexity that the mobile computing device is not appropriate for performing and the first server is appropriate for performing.

In some embodiments, when the degree of OCR complexity is greater than the second OCR complexity threshold, the technique can include: transmitting, from the mobile computing device, all of the image to the first server, and receiving, at the mobile computing device, all of the OCR text from the first server.

In other embodiments, when the degree of translation complexity is greater than the first translation complexity threshold and less than a second translation complexity threshold, the technique can include: transmitting, from the mobile computing device, at least the portion of the OCR text to the second server, and receiving, at the mobile computing device, at least the portion of the translated OCR text from the second server.

In some embodiments, the second translation complexity threshold represents a degree of translation complexity that the mobile computing device is not appropriate for performing and the second server is appropriate for performing.

In other embodiments, when the degree of OCR complexity is greater than the second translation complexity threshold, the technique can include: transmitting, from the mobile computing device, all of the OCR text to the second server, and receiving, at the mobile computing device, all of the translated OCR text from the first server.

In some embodiments, the translated OCR text includes first and second portions corresponding to machine language translation by the mobile computing device and the second server, respectively, and outputting the translated OCR text includes outputting, at the display of the mobile computing device, the first portion of the translated OCR text while awaiting the second portion of the translated OCR text from the second server.

In other embodiments, the OCR text includes first and second portions corresponding to the first and second portions of the translated OCR text, respectively, and outputting the translated OCR text includes outputting, at the display of the mobile computing device, the first portion of the translated OCR text and the second portion of the OCR text while awaiting the second portion of the translated OCR text from the second server.

In some embodiments, the technique further includes outputting, at the display of the mobile computing device, the first and second portions of the translated OCR text in response to receiving the second portion of the translated OCR text from the second server.

A mobile computing device having one or more processors configured to perform operations is presented. The operations can include receiving an image of an object comprising a text in a source language. The operations can include determining a degree of OCR complexity for performing OCR on the image to obtain the text. When the degree of OCR complexity is less than a first OCR complexity threshold the first OCR complexity threshold representing a degree of OCR complexity that the mobile computing device is appropriate for performing, the operations can include performing OCR on the image to obtain an OCR text. When the degree of OCR complexity is greater than the first OCR complexity threshold, the operations can include: (i) transmitting, via a communication device, at least a portion of the image to a first server, and (ii) receiving, via the communication device, at least a portion of the OCR text from the first server. The operations can include determining a degree of translation complexity for translating the OCR text from the source language to a target language. When the degree of translation complexity is less than a first translation complexity threshold the first OCR complexity threshold representing a degree of translation complexity that the mobile computing device is appropriate for performing, the operations can include performing machine language translation of the OCR text from the source language to a target language to obtain a translated OCR text in the target language. When the degree of translation complexity is greater than the first translation complexity threshold, the operations can include (i) transmitting, via the communication device, at least a portion of the OCR text to a second server, and (ii) receiving, via the communication device, at least a portion of the translated OCR text from the second server. The operations can also include outputting the translated OCR text at a display of the mobile computing device.

In some embodiments, when the degree of OCR complexity is greater than the first OCR complexity threshold and less than a second OCR complexity threshold, the operations can further include: transmitting, via the communication device, at least the portion of the image to the first server, and receiving, via the communication device, at least the portion of the OCR text from the first server.

In other embodiments, the second OCR complexity threshold represents a degree of OCR complexity that the mobile computing device is not appropriate for performing and the first server is appropriate for performing.

In some embodiments, when the degree of OCR complexity is greater than the second OCR complexity threshold, the operations can further include: transmitting, via the communication device, all of the image to the first server, and receiving, via the communication device, all of the OCR text from the first server.

In other embodiments, when the degree of translation complexity is greater than the first translation complexity threshold and less than a second translation complexity threshold, the operations can further include: transmitting, via the communication device, at least the portion of the OCR text to the second server, and receiving, via the communication device, at least the portion of the translated OCR text from the second server.

In some embodiments, the second translation complexity threshold represents a degree of translation complexity that the mobile computing device is not appropriate for performing and the second server is appropriate for performing.

In other embodiments, when the degree of OCR complexity is greater than the second translation complexity threshold, the operations can further include: transmitting, via the communication device, all of the OCR text to the second server, and receiving, via the communication device, all of the translated OCR text from the first server.

In some embodiments, the translated OCR text includes first and second portions corresponding to machine language translation by the mobile computing device and the second server, respectively, and outputting the translated OCR text at the display of the mobile computing device includes displaying the first portion of the translated OCR text while awaiting the second portion of the translated OCR text from the second server.

In other embodiments, the OCR text includes first and second portions corresponding to the first and second portions of the translated OCR text, respectively, and outputting the translated OCR text at the display of the mobile computing device includes displaying the first portion of the translated OCR text and the second portion of the OCR text while awaiting the second portion of the translated OCR text from the second server.

In some embodiments, the operations further include outputting, at the display of the mobile computing device, the first and second portions of the translated OCR text in response to receiving the second portion of the translated OCR text from the second server.

Another computer-implemented technique is also presented. The technique can include receiving, at a mobile computing device having one or more processors, an image of an object comprising a text in a source language. The technique can include determining, at the mobile computing device, a degree of OCR complexity for performing OCR on the image to obtain the text. The technique can include transmitting, from the mobile computing device to a server, at least a portion of the image based on the degree of OCR complexity. The technique can include receiving, at the mobile computing device from the server, OCR results. The technique can include obtaining, at the mobile computing device, an OCR text based on the OCR results. The technique can include obtaining, at the mobile computing device, a machine language translation of the OCR text from the source language to a target language to obtain a translated OCR text. The technique can also include outputting, at a display of the mobile computing device, the translated OCR text.

In some embodiments, the technique further includes: performing, at the mobile computing device, OCR for the entire image when the degree of OCR complexity is less than a first OCR complexity threshold, and transmitting, from the mobile computing device to the server, at least the portion of the image when the degree of OCR complexity is greater than the first OCR complexity threshold.

In other embodiments, the first OCR complexity threshold represents a degree of OCR complexity that the mobile computing device is appropriate for performing itself.

In some embodiments, the technique further includes transmitting, from the mobile computing device to the server, all of the image when the degree of OCR complexity is greater than a second OCR complexity threshold that is greater than the first OCR complexity threshold.

In other embodiments, the second OCR complexity threshold represents a degree of OCR complexity that the mobile computing device is not appropriate for performing itself.

In some embodiments, when the degree of OCR complexity is between the first and second OCR complexity thresholds, the mobile computing device performs OCR for a first portion of the image and the mobile computing device transmits a second portion of the image to the server, the first and second portions of the image collectively forming the entire image.

Another computer-implemented technique is also presented. The technique can include receiving, at a mobile computing device having one or more processors, an image of an object comprising a text in a source language. The technique can include obtaining, at the mobile computing device, OCR results for the object and the text to obtain an OCR text. The technique can include determining, at the mobile computing device, the source language of the OCR text. The technique can include determining, at the mobile computing device, a degree of translation complexity for performing machine language translation of the OCR text from the source language to a target language. The technique can include transmitting, from the mobile computing device to a server, at least a portion of the OCR text based on the degree of translation complexity. The technique can include receiving, at the mobile computing device from the server, machine language translation results. The technique can include obtaining, at the mobile computing device, a translated OCR text based on the machine language translation results. The technique can also include outputting, at a display of the mobile computing device, the translated OCR text.

In some embodiments, the technique further includes: performing, at the mobile computing device, machine language translation for the entire OCR text when the degree of translation complexity is less than a first translation complexity threshold, and transmitting, from the mobile computing device to the server, at least the portion of the OCR text when the degree of translation complexity is greater than the first translation complexity threshold.

In other embodiments, the first translation complexity threshold represents a degree of translation complexity that the mobile computing device is appropriate for performing itself.

In some embodiments, the technique further includes: transmitting, from the mobile computing device to the server, all of the OCR text when the degree of translation complexity is greater than a second translation complexity threshold that is greater than the first translation complexity threshold.

In other embodiments, the second translation complexity threshold represents a degree of translation complexity that the mobile computing device is not appropriate for performing itself.

In some embodiments, when the degree of translation complexity is between the first and second translation complexity thresholds, the mobile computing device performs machine language translation for a first portion of the OCR text and the mobile computing device transmits a second portion of the OCR text to the server, the first and second portions of the OCR text collectively forming the entire OCR text.

In other embodiments, machine language translation results for the first portion of the OCR text that are obtained by the mobile computing device are output to the display of the mobile computing device before the machine language translation results for the second portion of the OCR text are received from the server.

Another computer-implemented technique is also presented. The technique can include receiving, at a mobile computing device having one or more processors, an image of an object comprising a text in a source language. The technique can include determining, at the mobile computing device, a degree of OCR complexity for performing OCR on the image to obtain the text. The technique can include transmitting, from the mobile computing device to a first server, at least a portion of the image based on the degree of OCR complexity. The technique can include receiving, at the mobile computing device from the first server, OCR results. The technique can include obtaining, at the mobile computing device, an OCR text based on the OCR results. The technique can include determining, at the mobile computing device, a degree of translation complexity for performing machine language translation of the OCR text from the source language to a target language. The technique can include transmitting, from the mobile computing device to a second server, at least a portion of the OCR text based on the degree of translation complexity. The technique can include receiving, at the mobile computing device from the second server, machine language translation results. The technique can include obtaining, at the mobile computing device, a translated OCR text based on the machine language translation results. The technique can also include outputting, at a display of the mobile computing device, the translated OCR text.

In some embodiments, the technique further includes: performing, at the mobile computing device, OCR for the entire image when the degree of OCR complexity is less than a first OCR complexity threshold, wherein the first OCR complexity threshold represents a degree of OCR complexity that the mobile computing device is appropriate for performing itself, and transmitting, from the mobile computing device to the first server, at least the portion of the image when the degree of OCR complexity is greater than the first OCR complexity threshold.

In other embodiments, the technique further includes: transmitting, from the mobile computing device to the first server, all of the image when the degree of OCR complexity is greater than a second OCR complexity threshold that is greater than the first OCR complexity threshold, wherein the second OCR complexity threshold represents a degree of OCR complexity that the mobile computing device is not appropriate for performing itself, and when the degree of OCR complexity is between the first and second OCR complexity thresholds, the mobile computing device performs OCR for a first portion of the image and the mobile computing device transmits a second portion of the image to the first server, the first and second portions of the image collectively forming the entire image.

In some embodiments, the technique further includes: performing, at the mobile computing device, machine language translation for the entire OCR text when the degree of translation complexity is less than a first translation complexity threshold, wherein the first translation complexity threshold represents a degree of translation complexity that the mobile computing device is appropriate for performing itself, and transmitting, from the mobile computing device to the second server, at least the portion of the OCR text when the degree of translation complexity is greater than the first translation complexity threshold.

In other embodiments, the technique further includes: transmitting, from the mobile computing device to the second server, all of the OCR text when the degree of translation complexity is greater than a second translation complexity threshold that is greater than the first translation complexity threshold, wherein the second translation complexity threshold represents a degree of translation complexity that the mobile computing device is not appropriate for performing itself, and when the degree of translation complexity is between the first and second translation complexity thresholds, the mobile computing device performs machine language translation for a first portion of the OCR text and the mobile computing device transmits a second portion of the OCR text to the second server, the first and second portions of the OCR text collectively forming the entire OCR text.

In some embodiments, the translated OCR text includes first and second portions corresponding to machine language translation by the mobile computing device and the second server, respectively, and outputting the translated OCR text at the display of the mobile computing device includes displaying the first portion of the translated OCR text while awaiting the second portion of the translated OCR text from the second server, and subsequently outputting, at the display of the mobile computing device, the first and second portions of the translated OCR text in response to receiving the second portion of the translated OCR text from the second server.

Another computer-implemented technique is also presented. The technique can include obtaining, at a mobile computing device having one or more processors, a text in a source language. The technique can include determining, at the mobile computing device, the source language of the text. The technique can include determining, at the mobile computing device, a degree of translation complexity for performing machine language translation of the text from the source language to a target language. The technique can include transmitting, from the mobile computing device to a server, at least a portion of the text based on the degree of translation complexity. The technique can include receiving, at the mobile computing device from the server, machine language translation results. The technique can include obtaining, at the mobile computing device, a translated text based on the machine language translation results. The technique can also include outputting, at a display of the mobile computing device, the translated text.

In some embodiments, the technique further includes: performing, at the mobile computing device, machine language translation for the entire text when the degree of translation complexity is less than a first translation complexity threshold, and transmitting, from the mobile computing device to the server, at least the portion of the text when the degree of translation complexity is greater than the first translation complexity threshold.

In other embodiments, the first translation complexity threshold represents a degree of translation complexity that the mobile computing device is appropriate for performing itself.

In some embodiments, the technique further includes transmitting, from the mobile computing device to the server, all of the text when the degree of translation complexity is greater than a second translation complexity threshold that is greater than the first translation complexity threshold.

In other embodiments, the second translation complexity threshold represents a degree of translation complexity that the mobile computing device is not appropriate for performing itself.

In some embodiments, when the degree of translation complexity is between the first and second translation complexity thresholds, the mobile computing device performs machine language translation for a first portion of the text and the mobile computing device transmits a second portion of the text to the server, the first and second portions of the text collectively forming the entire text.

In other embodiments, machine language translation results for the first portion of the text that are obtained by the mobile computing device are output to the display of the mobile computing device before the machine language translation results for the second portion of the text are received from the server.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 3A-3C are flow diagrams of example techniques for distributed optical character recognition (OCR) and/or distributed machine language translation according to some implementations of the present disclosure.

DETAILED DESCRIPTION

Computer servers may have greater processing power than mobile computing devices (tablet computers, mobile phones, etc.) and thus they may generate better optical character recognition (OCR) results and machine language translation results. While computing servers can typically generate faster and/or more accurate results, obtaining these results at the mobile computing device can be slower due to network delays associated with transmitting data. Moreover, in simple/non-complex cases, the mobile computing device may be capable of generating the same results as a server. For example, an image may have a small quantity of text and/or very large text. Similarly, for example, a text for translation may have a small quantity of characters/words/sentences and/or may be a linguistically simple text.

Accordingly, techniques are presented for distributed OCR and distributed language translation. These techniques involve selectively distributing OCR and/or machine language translation tasks between a mobile computing device and one or more servers based on degrees of complexity for the respective tasks. The mobile computing device can receive an image of an object comprising a text in a source language. The mobile computing device can determine a degree of OCR complexity for obtaining the text from the image. Based on this degree of OCR complexity, the mobile computing device and/or a server can perform OCR to obtain an OCR text. The mobile computing device can then determine a degree of translation complexity for translating the OCR text from the source language to a target language. Based on this degree of translation complexity, the mobile computing device and/or a server can perform machine language translation of the OCR text from the source language to a target language to obtain a translated OCR text. The mobile computing device can then output the translated OCR text. It will be appreciated that the distributed OCR techniques and the distributed machine language translation techniques of the present disclosure can be used individually (separately) or together. In one example implementation, the distributed OCR techniques of the present disclosure can be used to obtain an OCR text, and the translated text can be obtained from the OCR text. In another example implementation, an OCR text can be obtained from an image, and the distributed machine language translation techniques of the present disclosure can be performed to obtain a translated text. In other example implementations, an OCR text can be determined and stored/output using the distributed OCR techniques of the present disclosure, and/or a translated of an input text can be determined and stored/output using the distributed machine language translation techniques of the present disclosure.

Figure 1:
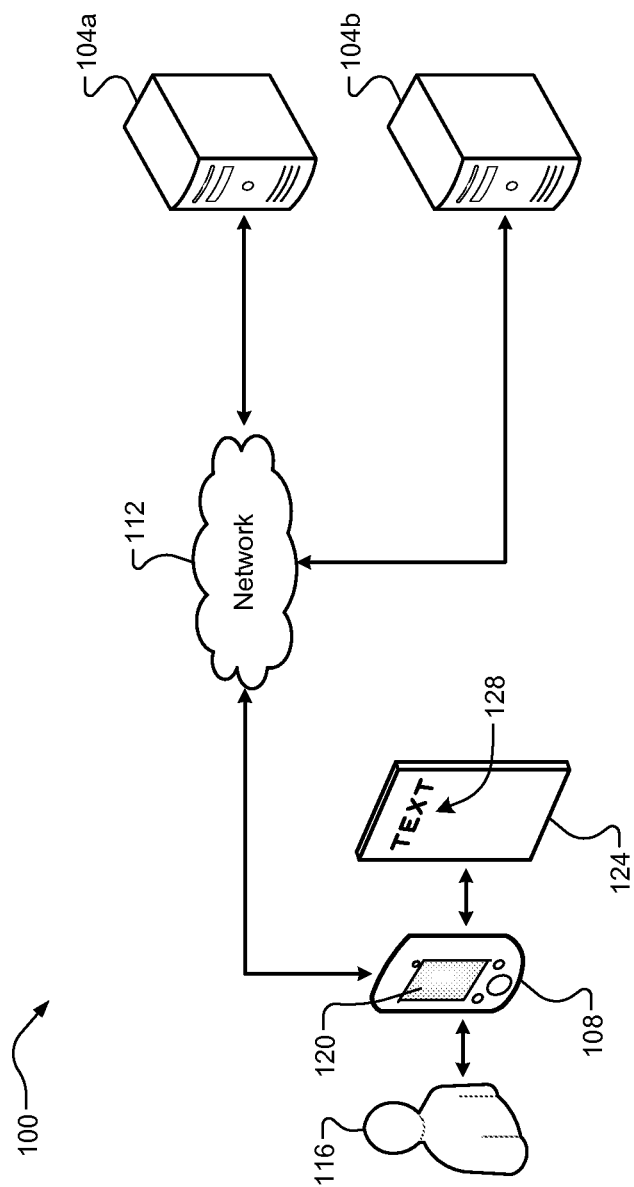
FIG. 1 is a functional block diagram of a computing network including an example mobile computing device according to some implementations of the present disclosure.

Referring now to FIG. 1, a computing network 100 is illustrated. The computing network 100 includes servers 104a and 104b (collectively "servers 104"). For example, server 104a may be an OCR server and server 104b may be a machine language translation server. It should be appreciated, however, that the term "server" as used herein can refer to both a single hardware computer server and a plurality of similar servers operating in a parallel or distributed architecture. The computing network 100, therefore, may include a single server 104 that performs both OCR and machine language translation, or the computing network 100 may include three or more servers that collectively perform OCR and machine language translation.

A mobile computing device 108 is configured to communicate with the servers 104 via a network 112. Examples of the mobile computing device 108 include a laptop computer, a tablet computer, a mobile phone, and wearable technology, such as a smartwatch, eyewear, or other wearable objects that incorporate a computing device. It should be appreciated, however, that the techniques of the present disclosure could be implemented at any computing device having a display and a camera, e.g., a desktop computer. The network 112 can include a local area network (LAN), a wide area network (WAN), e.g., the Internet, or a combination thereof. The mobile computing device 108 can be associated with a user 116. For example, the user 116 can interact with the mobile computing device 108 via a display 120, e.g., a touch display.

The user 116 can use the mobile computing device 108 to interact with an object 124 having a text 128 thereon. The object 124 can be any object suitable to display the text 128, including, but not limited to, a document, a sign, an advertisement, and a menu. For example, the user 116 may command the mobile computing device 108 to capture an image of the object 124 and its text 128 using a camera 212 (see FIG. 2) associated with the mobile computing device 108. OCR can be performed on the image to detect the text 128. After obtaining the text 128, the text 128 can then be translated from its source language to a target language, such as a language understood/spoken by the user 116.

Figure 2:
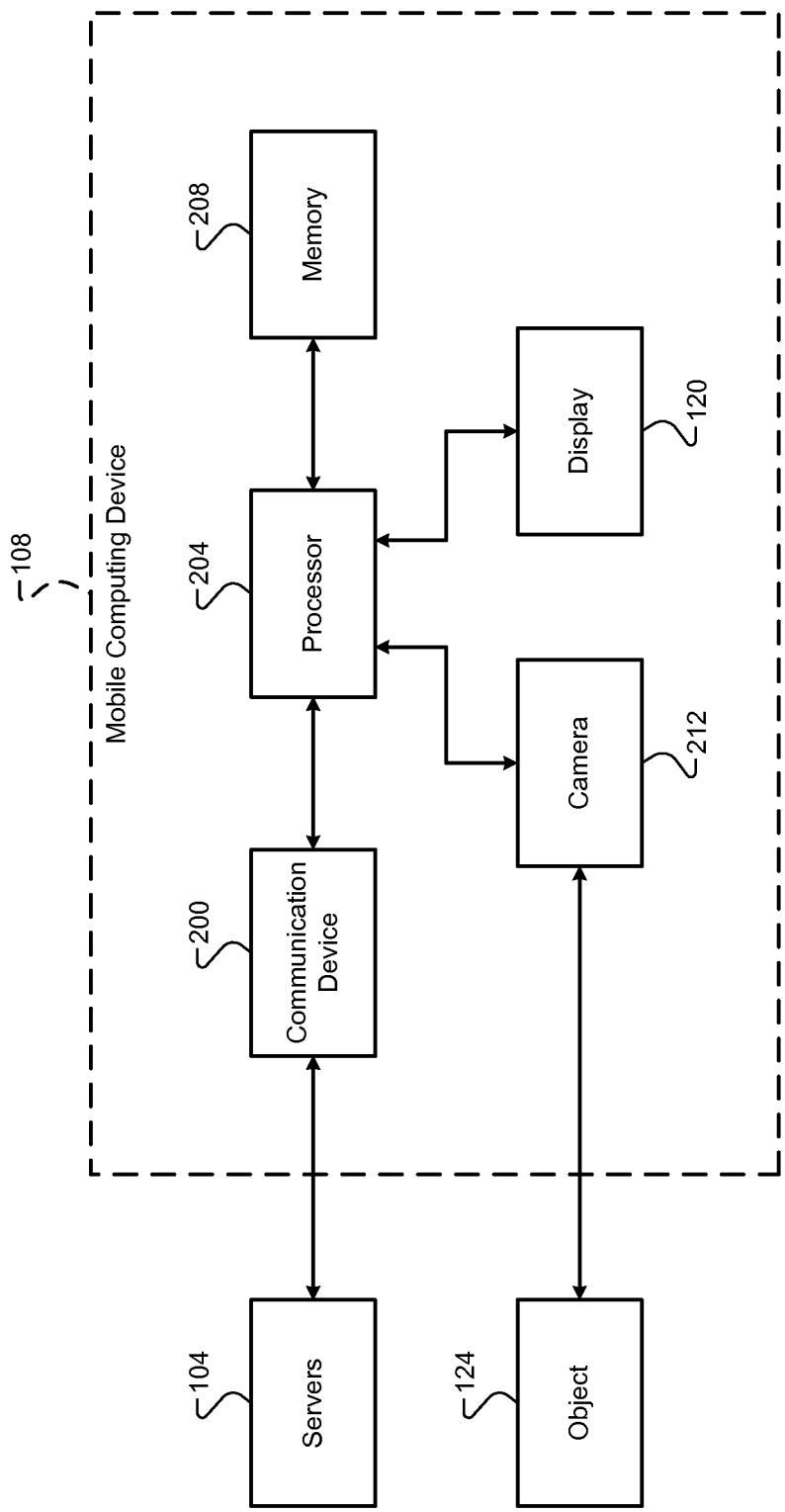
FIG. 2 is a functional block diagram of the example mobile computing device of FIG. 1.

Referring now to FIG. 2, a functional block diagram of the example mobile computing device 108 is illustrated. The mobile computing device 108 can include the display 120, a communication device 200, a processor 204, a memory 208, and the camera 212. It should be appreciated that the mobile computing device 108 can also include other suitable components, such as physical buttons, a microphone, and a speaker. The communication device 200 can include any suitable components (such as a transceiver) that are configured to communicate with other devices, e.g., the servers 104, via the network 112. The memory 208 can be any suitable storage medium (flash, hard disk, etc.) configured to store information at the mobile computing device 108.

The processor 204 can control operation of the mobile computing device 108. Example functions performed by the processor 204 include, but are not limited to, controlling transmission/reception of information via the communication device 200 and controlling read/write operations at the memory 208. The processor 204 can also process information received from the camera 212 and output information to the display 120. The camera 212 can be any suitable camera (charge-coupled device (CCD), complimentary metal-oxide-semiconductor (CMOS), etc.) configured to capture an image of the object 124 and its text 128. In one implementation, the display 120 is a touch display configured to receive input from the user 116. The processor 204 can also be configured to execute at least a portion of the techniques of the present disclosure, which are now discussed in greater detail.

The processor 204 can receive an image of the object 124 and its text 128 from the camera 212. The image can be captured by the camera 212 by the user 116 positioning the camera 212 and providing an input to capture the image. When OCR on the image is requested, the processor 204 can determine a degree of OCR complexity for the text 128. For example, the degree of OCR complexity may be determined in response to an OCR request that is (i) generated in response to an input by the user 116 or (ii) generated automatically in response to capturing the image with the camera 212. The degree of OCR complexity is indicative of a degree of difficulty for the processor 204 to perform the OCR itself. Based on the degree of OCR complexity, the processor 204 can determine whether to transmit the image to the server 104a for OCR.

Example factors in determining the degree of OCR complexity include, but are not limited to, a resolution of the image, a size of the object 124 and/or its text 128, a style/font of the text 128, and/or an angle/view at which the image was captured. More specifically, when the image is captured at an angle, i.e., not straight-on or straight-forward, the text 128 in the image may be skewed. A high resolution image may correspond to a lower degree of OCR complexity, whereas a low resolution image may correspond to a higher degree of OCR complexity. A large, non-styled, and/or basic font may correspond to a lower degree of OCR complexity, whereas a small, styled, and/or complex font may correspond to a higher degree of OCR complexity. Little or no skew may correspond to a lower degree of OCR complexity, whereas highly skewed text may correspond to a higher degree of OCR complexity.

As mentioned above, the processor 204 can determine whether to transmit the image to the server 104a for OCR based on the degree of OCR complexity. For example, the processor 204 may compare the degree of OCR complexity to one or more OCR complexity thresholds. The OCR complexity threshold(s) can be predefined or user-defined. In some cases, the degree of OCR complexity may indicate that the server 104a is appropriate (or more appropriate than the processor 204) for performing OCR for at least a portion of the image. In these cases, the processor 204 may transmit at least the portion of the image to the server 104a. In other cases, the processor 204 may transmit the entire image to the server 104a for OCR, or may not transmit anything to the server 104a and thus may perform the OCR entirely by itself.

More specifically, when the degree of OCR complexity is less than a first OCR complexity threshold, the processor 204 may perform the OCR entirely by itself. When the degree of OCR complexity is greater than the first OCR complexity threshold and less than a second OCR complexity threshold, the processor 204 may transmit at least the portion of the image to the server 104b. When the degree of OCR complexity is greater than the second OCR complexity threshold, the processor 204 may transmit the entire image to the server 104b. Further, in some cases, the processor 204 may determine that a lower resolution version of the image is sufficient for the server 104*a* and thus the processor 204 may transmit at least a portion of the lower resolution version of the image to the server 104*a*. When at least the portion of the image is transmitted to the server 104*a*, the server 104*a* can return OCR results to the mobile computing device 108.

The appropriateness of the server 104*a* and the processor 204 to perform OCR on the image can refer to an expected level of accuracy and/or efficiency for the server 104*a* and the processor 204 to perform the OCR, respectively. The processor 204 can use any suitable OCR algorithms to perform the OCR itself. After obtaining the OCR results locally and/or from the server 104*a*, the processor 204 can compile the OCR results to obtain an OCR text. The OCR text represents OCR results for the object 124 having the text 128 thereon. Depending on the quality of the OCR results, the OCR text may be the same as the text 128 or different than the text 128. The processor 204 can determine a source language of the OCR text.

Once the OCR text is obtained, the processor 204 can determine the source language of the OCR text. When the processor 204 is not confident in its determination of the source language, the processor 204 may send the OCR text to the server 104*b* for this determination and, if requested, for machine language translation as well. When machine language translation of the OCR text is requested, the OCR text can be translated from its source language to a target language. For example, the OCR text can be translated in response to a translation request that is (i) generated in response to an input from the user 116 or (ii) generated automatically in response to determining that the source language is not one or one or more languages preferred by the user 116. In response to this translation request, the processor 204 can determine a degree of translation complexity for translating the OCR text from the source language to the target language. The degree of translation complexity is indicative of a degree of difficulty for the processor 204 to perform machine language translation of the OCR text itself.

Example factors in determining the degree of translation complexity include, but are not limited to, complexities of the source language and/or the target language and a number of characters, words, and/or sentences in the OCR text. Less complex (simple), more common, and/or more utilized languages may correspond to a higher degree of translation complexity, whereas more complex, less common, and/or less utilized languages may correspond to a higher degree of translation complexity. Fewer characters, words, and/or sentences may correspond to a lower degree of translation complexity, whereas more characters, words, and/or sentences may correspond to a higher degree of translation complexity. For example only, English may have a low degree of translation complexity and Russian may have a high degree of translation complexity.

Based on the degree of translation complexity, the processor 204 can determine whether to transmit the OCR text to the server 104*b* for machine language translation. For example, the processor 204 may compare the degree of translation complexity to one or more translation complexity thresholds. The translation complexity threshold(s) can be predefined or user-defined. The mobile computing device 108 may also have local language packs, e.g., stored at the memory 208, and these local language packs may contain information that can be used by the processor 204 in performing machine language translation itself. The presence and type of these local language packs, therefore, may affect the translation complexity threshold(s). In some cases, the degree of translation complexity may indicate that the server 104*b* is appropriate (or more appropriate than the processor 204) for performing machine language translation for at least a portion of the OCR text.

In these cases, the processor 204 may transmit at least the portion of the OCR text to the server 104*b*. In other cases, the processor 204 may transmit the entire OCR text to the server 104*b* for OCR, or may not transmit anything to the server 104*b* and thus may perform the machine language translation entirely by itself. More specifically, when the degree of translation complexity is less than a first translation complexity threshold, the processor 204 may perform the machine language translation entirely by itself. When the degree of translation complexity is greater than the first translation complexity threshold and less than a second translation complexity threshold, the processor 204 may transmit at least the portion of the OCR text to the server 104*b*. When the degree of translation complexity is greater than the second translation complexity threshold, the processor 204 may transmit the entire OCR text to the server 104*b*.

The processor 204 can use any suitable machine translation algorithms to perform the machine language translation itself. After obtaining the machine language translation results locally and/or from the server 104*b*, the processor 204 can compile the machine language translation results to obtain a translated text. The translated text represents machine language translation results for the OCR text. Depending on the quality of the machine language translation results, the translated text may or may not be an accurate translation of the OCR text from the source language to the target language. Similarly, depending on the quality of the OCR results as discussed above, the translated text may or may not be an accurate translation of the text 128 of the object 124 from the source language to the target language. After obtaining the translated text, the processor 204 can output the translated text. For example, the processor 204 can output the translated text to the display 120.

Figure 3A:
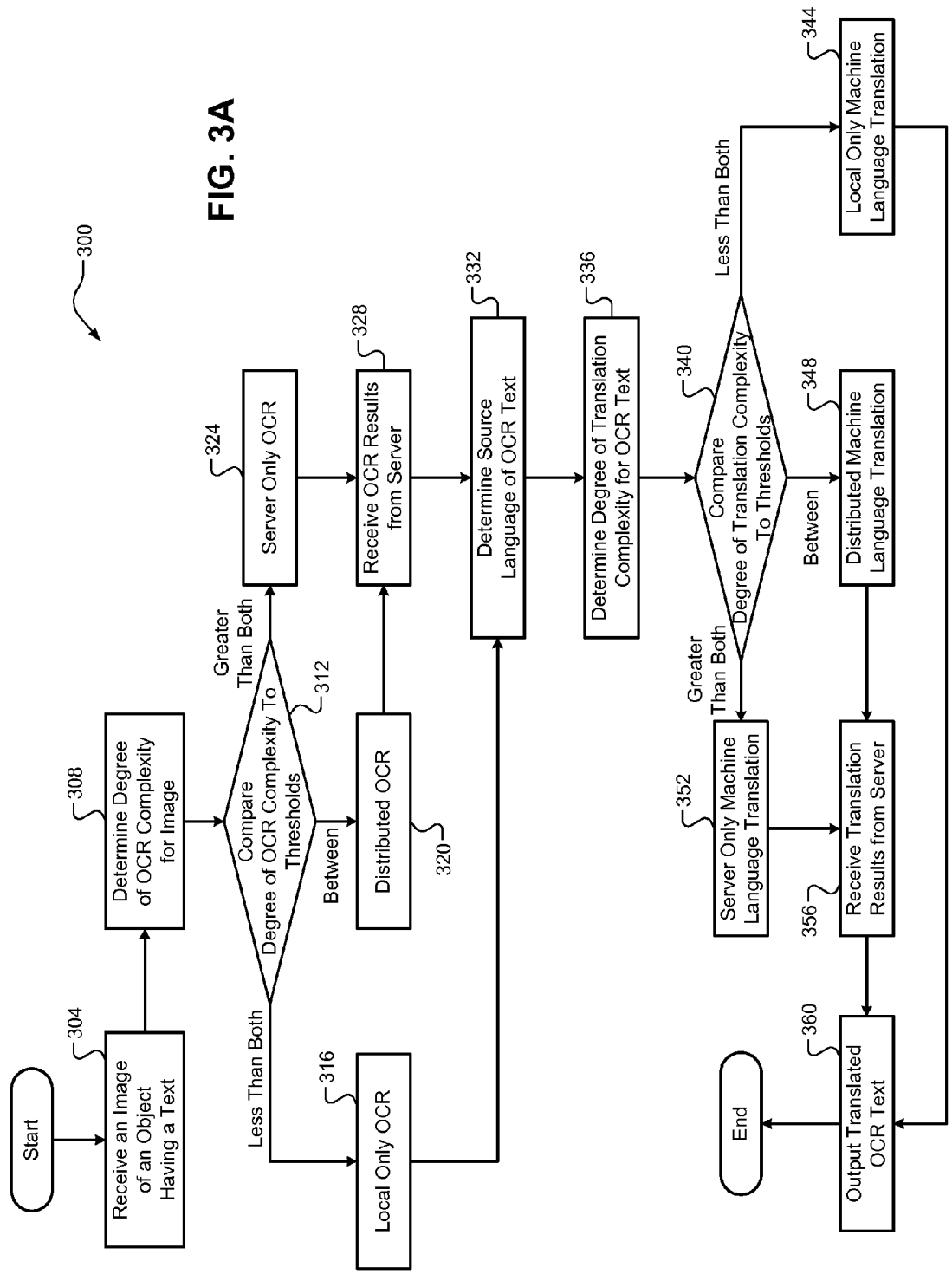

Referring now to FIG. 3A, a flow diagram of an example technique 300 for distributed OCR and distributed machine language translation is illustrated. At 304, the mobile computing device 108 can receive an image of the object 124 comprising the text 128 in a source language. At 308, the mobile computing device 108 can determine the degree of OCR complexity for performing OCR on the image to obtain the text 128. At 312, the mobile computing device 108 can compare the degree of OCR complexity to the first and second OCR complexity thresholds. When the degree of OCR complexity is less than the first OCR complexity threshold, the processor 204 can perform OCR on the image entirely by itself at 316 and then proceed to 332.

When the degree of OCR complexity is between the first and second OCR complexity thresholds, the mobile computing device 108 can transmit a portion of the image to the server 104*a* for OCR at 320 and then proceed to 328. When the degree of OCR complexity is greater than the second OCR complexity threshold, the mobile computing device 108 can transmit the entire image to the server 104*a* for OCR at 324 and then proceed to 328. At 328, the mobile computing device 108 can receive OCR results from the server 104*a* and obtain the OCR text. At 332, the mobile computing device 108 can determine the source language of the OCR text. In some implementations, the mobile computing device 108 may transmit at least a portion the OCR text to the server 104*b* to determine the source language.

At 336, the mobile computing device 108 can determine a degree of translation complexity for translating the OCR text from the source language to a target language. At 340, the mobile computing device 108 can compare the degree of translation complexity to the first and second translation complexity thresholds. When the degree of translation complexity is less than the first translation complexity threshold, the mobile computing device 108 can perform machine language translation of the OCR text entirely by itself at 344 and then proceed to 360. When the degree of translation complexity is between the first and second translation complexity thresholds, the mobile computing device 108 can transmit a portion of the OCR text to the server 104b for machine language translation at 348 and then proceed to 356.

When the degree of translation complexity is greater than the second translation complexity threshold, the mobile computing device 108 can transmit the entire OCR text to the server 104b for machine language translation at 352 and then proceed to 356. At 356, the mobile computing device 108 can receive the machine language translation results from the server 104b and obtain the translated OCR text. At 360, the mobile computing device 108 can output the translated OCR text at the display 120. In some implementations, outputting the translated OCR text at the display includes outputting a portion of the translated OCR text obtained by the mobile computing device before outputting another portion of the OCR text obtained from the server 104b. The technique 300 can then end or return to 304 for one or more additional cycles.

Referring now to FIG. 3B, an example technique 370 for distributed OCR is presented. At 371, the mobile computing device 104 can receive an image of the object 124 comprising the text 128 in the source language. At 372, the mobile computing device 108 can determine the degree of OCR complexity for performing OCR on the image to obtain the text 128. At 373, the mobile computing device 108 can transmit at least a portion of the image to the server 104a based on the degree of OCR complexity. At 374, the mobile computing device 108 can receive OCR results from the server 104a. At 375, the mobile computing device 108 can obtain an OCR text using the OCR results. At 376, the mobile computing device 108 can obtain a machine language translation of the OCR text from the source language to a target language to obtain a translated OCR text. At 377, the mobile computing device 108 can output the translated OCR text. The technique 370 can then end or return to 371 for one or more additional cycles.

Referring now to FIG. 3C, an example technique 380 for distributed machine language translation is presented. At 381, the mobile computing device 108 can receive an image of the object 124 comprising the text 128 in the source language. At 382, the mobile computing device 108 can obtain an OCR text from the image. At 383, the mobile computing device 108 can determine the source language of the OCR text. In some implementations, the mobile computing device 108 can transmit at least a portion of the OCR text to the server 104b to determine the source language. At 384, the mobile computing device 108 can determine a degree of translation complexity for performing machine language translation of the OCR text from the source language to a target language. At 385, the mobile computing device 108 can transmit at least a portion of the OCR text to the server 104b based on the degree of translation complexity. At 386, the mobile computing device 108 can receive machine language translation results from the server 104b. At 387, the mobile computing device 108 can obtain a translation of the OCR text from the source language to the target language based on the machine language translation results to obtain a translated OCR text. At 388, the mobile computing device 108 can output the translated OCR text. The technique 380 can then end or return to 381 for one or more additional cycles.

Figure 4B:
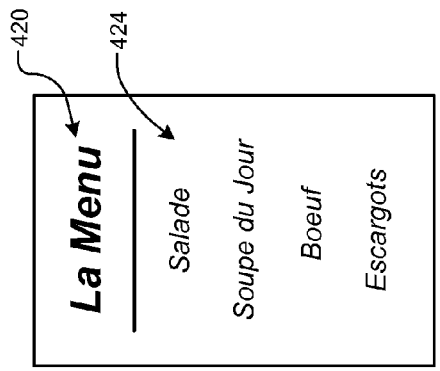
FIGS. 4A-4D illustrate an example display of the example mobile computing device at various stages during execution of the distributed OCR and machine language translation techniques according to some implementations of the present disclosure.
Figure 4D:
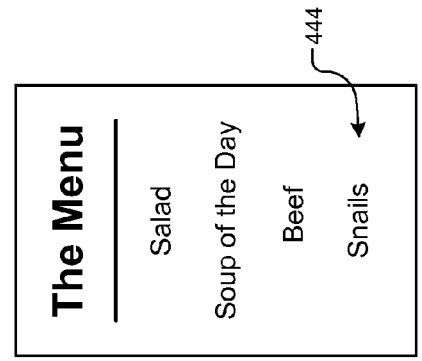
Figure 4A:
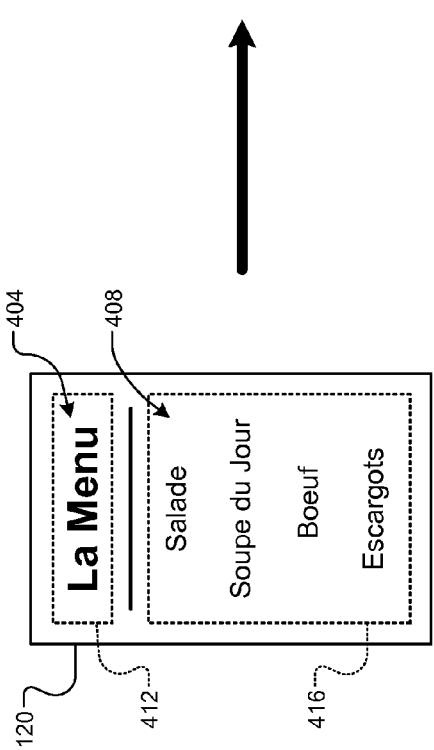

Referring now to FIGS. 4A-4B, the display 120 of the example mobile computing device 108 at various stages during execution of the distributed OCR and machine language translation techniques is illustrated. FIG. 4A illustrates an image of the object 124, which for purposes of FIGS. 4A-4B is a menu in French. The menu includes header/title text 404 ("La Menu") that is larger than other text 408. As previously discussed herein, the degree of OCR complexity can vary depending on text size, text style (bold, italics, etc.), and other similar factors. In this example, the mobile computing device 108 performs OCR for the header/title text 404 and the server 104a performs OCR for the other text 408. More specifically, the mobile computing device 108 performs OCR for a first portion 412 containing the header/title text 404 and the server 104a performs OCR for a second portion 416 containing the other text 408.

FIG. 4B illustrates the results of the distributed OCR. The mobile computing device 108 obtained a header/title OCR text 420 from the first portion 412 and the server 104a obtained and provided another OCR text 424. These OCR texts 420, 424 collectively represent the OCR text for the image. In some implementations, the OCR texts 420, 424 can be italicized or otherwise accented, e.g., outlined or bordered, to indicate that OCR is complete and/or machine language translation has not yet been performed. For example, the local OCR may be completed first and thus the header/title OCR text 420 may be accented before the other OCR text 424. In this example, the user 116 is an English speaking user that cannot read or understand French, so he/she requests machine language translation. This could be performed automatically, e.g., based on their language preferences, or in response to an input from the user 116, e.g., selecting an icon, such as the camera button, or by pushing a physical button.

Figure 4C:
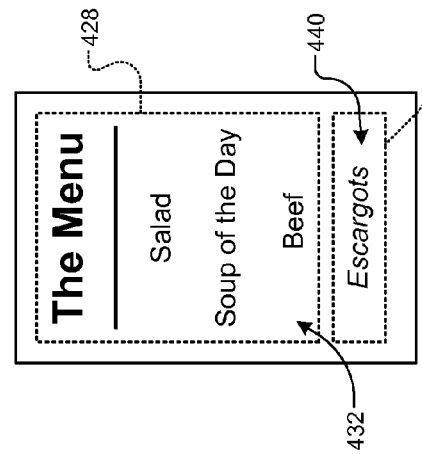

FIG. 4C illustrates the results of the local machine language translation from French to English. In this example, the mobile computing device 108 has a French-English local language pack, e.g., stored at the memory 208, and thus the mobile computing device 108 is capable of some French to English machine language translation. More specifically, the mobile computing device 108 is appropriate for performing machine language translation of a first portion 428 of the OCR text to obtain a first translated OCR text 432. This first portion 428 of the OCR text may include easy/simple words for French to English machine language translation. The mobile computing device 108, however, may be incapable of, inaccurate in, or inefficient in performing machine language translation on a second portion 436 of the OCR text. More specifically, this second portion 436 of the OCR text includes a word 440 (Escargots) that the mobile computing device 108 is not appropriate for performing OCR.

Because the degree of translation complexity being too high, e.g., because the word 440 is not in the local language pack, the mobile computing device 108 can determine that the second portion 436 of the OCR text should be sent to the server 104b for machine language translation. In some implementations, the styling/accenting of the text can be removed once machine language translation is complete to notify the user 116. As shown in FIG. 4C, the first translated OCR text 432 has no styling or accenting. Lastly, FIG. 4D illustrates the results of the distributed machine language translation from French to English. The server 104*b* has obtained and provided a second translated OCR text 444. The first translated OCR text 432 and the second translated OCR text 444 collectively represent the translated OCR text for the image. In response to receiving the second translated OCR text 444 from the server 104*b*, the mobile computing device 108 displays the second translated OCR text 444. For example, the mobile computing device 108 may overlay and/or fade from the word 440 to the second translated OCR text 444.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
    during an image capture mode, receiving, at a mobile computing device having one or more processors, an image capture request;
    in response to receiving the image capture request:
        capturing, at the mobile computing device, an image of an object comprising a text in a source language;
        determining, at the mobile computing device, a degree of optical character recognition (OCR) complexity for performing OCR on the image to obtain the text;
        transmitting, from the mobile computing device to a server, at least a portion of the image based on the degree of OCR complexity;
        receiving, at the mobile computing device from the server, OCR results; and
        obtaining, at the mobile computing device, an OCR text based on the OCR results;
    in response to the image capture request and obtaining the OCR text, determining, at the mobile computing device, whether to translate the OCR text to a different target language; and
    in response to determining to translate the OCR text to the target language:
        obtaining, at the mobile computing device, a machine language translation of the OCR text from the source language to the target language to obtain a translated OCR text;
        obtaining, at the mobile computing device, a modified image by modifying (i) the image to replace the text with the translated OCR text and (ii) a styling of the translated OCR text such that its styling differs from a styling of the text; and
        outputting, at a display of the mobile computing device, the modified image.

2. The computer-implemented method of claim 1, further comprising:
    performing, at the mobile computing device, OCR for the entire image when the degree of OCR complexity is less than a first OCR complexity threshold, wherein the first OCR complexity threshold represents a degree of OCR complexity that the mobile computing device is appropriate for performing itself; and
    transmitting, from the mobile computing device to the server, at least the portion of the image when the degree of OCR complexity is greater than the first OCR complexity threshold.

3. The computer-implemented method of claim 2, further comprising transmitting, from the mobile computing device to the server, all of the image when the degree of OCR complexity is greater than a second OCR complexity threshold that is greater than the first OCR complexity threshold, wherein the second OCR complexity threshold represents a degree of OCR complexity that the mobile computing device is not appropriate for performing itself.

4. The computer-implemented method of claim 3, wherein when the degree of OCR complexity is between the first and second OCR complexity thresholds, the mobile computing device performs OCR for a first portion of the image and the mobile computing device transmits a second portion of the image to the server, the first and second portions of the image collectively forming the entire image.

5. The computer-implemented method of claim 4, wherein OCR results for the first portion of the image that are obtained by the mobile computing device are used to generate and display the modified image before the OCR results for the second portion of the image are subsequently received from the server and used to generate and display a further modified image.

6. The computer-implemented method of claim 1, wherein determining whether to translate the OCR text from the source language to the target language includes determining whether the source language is a preferred language of a user associated with the mobile computing device.

7. The computer-implemented method of claim 1, wherein the styling of the translated OCR text is at least one of one of (i) italics and (ii) outlined or bordered.

8. The computer-implemented method of claim 1, wherein the modified image is displayed during the image capture mode.

9. The computer-implemented method of claim 1, wherein the modified image is displayed during an image preview mode that is transitioned to after capturing the image during the image capture mode.

10. A computer-implemented method, comprising:
    during an image capture mode, receiving, at a mobile computing device having one or more processors, an image capture request;
    in response to receiving the image capture request:
        capturing, at the mobile computing device, an image of an object comprising a text in a source language;
        obtaining, at the mobile computing device, optical character recognition (OCR) results for the object and the text to obtain an OCR text; and
        determining, at the mobile computing device, the source language of the OCR text;
    in response to receiving the image capture request and determining the source language of the OCR text, determining, at the mobile computing device, whether to translate the OCR text to a different target language; and
    in response to determining to translate the OCR text to the target language:
        determining, at the mobile computing device, a degree of translation complexity for performing machine language translation of the OCR text from the source language to the target language;

transmitting, from the mobile computing device to a server, at least a portion of the OCR text based on the degree of translation complexity;

receiving, at the mobile computing device from the server, machine language translation results;

obtaining, at the mobile computing device, a translated OCR text based on the machine language translation results;

obtaining, at the mobile computing device, a modified image by modifying (i) the image to replace the text with the translated OCR text and (ii) a styling of the translated OCR text such that its styling differs from a styling of the text; and outputting, at a display of the mobile computing device, the modified image.

11. The computer-implemented method of claim 10, further comprising:

performing, at the mobile computing device, machine language translation for the entire OCR text when the degree of translation complexity is less than a first translation complexity threshold, wherein the first translation complexity threshold represents a degree of translation complexity that the mobile computing device is appropriate for performing itself; and transmitting, from the mobile computing device to the server, at least the portion of the OCR text when the degree of translation complexity is greater than the first translation complexity threshold.

12. The computer-implemented method of claim 11, further comprising transmitting, from the mobile computing device to the server, all of the OCR text when the degree of translation complexity is greater than a second translation complexity threshold that is greater than the first translation complexity threshold, wherein the second translation complexity threshold represents a degree of translation complexity that the mobile computing device is not appropriate for performing itself.

13. The computer-implemented method of claim 12, wherein when the degree of translation complexity is between the first and second translation complexity thresholds, the mobile computing device performs machine language translation for a first portion of the OCR text and the mobile computing device transmits a second portion of the OCR text to the server, the first and second portions of the OCR text collectively forming the entire OCR text.

14. The computer-implemented method of claim 13, wherein machine language translation results for the first portion of the OCR text that are obtained by the mobile computing device are used to generate and display the modified image before the machine language translation results for the second portion of the OCR text are subsequently received from the server and used to generate and display a further modified image.

15. The computer-implemented method of claim 10, wherein determining whether to translate the OCR text from the source language to the target language includes determining whether the source language is a preferred language of a user associated with the mobile computing device.

16. A computer-implemented method, comprising:

during an image capture mode, receiving, at a mobile computing device having one or more processors, an image capture request;

in response to receiving the image capture request:

capturing, at the mobile computing device, an image of an object comprising a text in a source language;

determining, at the mobile computing device, a degree of optical character recognition (OCR) complexity for performing OCR on the image to obtain the text;

transmitting, from the mobile computing device to a first server, at least a portion of the image based on the degree of OCR complexity;

receiving, at the mobile computing device from the first server, OCR results; and obtaining, at the mobile computing device, an OCR text based on the OCR results;

in response to receiving the image capture request and obtaining the OCR text, determining, at the mobile computing device, whether to translate the OCR text to a different target language; and in response to determining to translate the OCR text to the target language:

determining, at the mobile computing device, a degree of translation complexity for performing machine language translation of the OCR text from the source language to the target language;

transmitting, from the mobile computing device to a second server, at least a portion of the OCR text based on the degree of translation complexity;

receiving, at the mobile computing device from the second server, machine language translation results;

obtaining, at the mobile computing device, a translated OCR text based on the machine language translation results;

obtaining, at the mobile computing device, a modified image by modifying (i) the image to replace the text with the translated OCR text and (ii) a styling of the translated OCR text such that its styling differs from a styling of the text; and outputting, at a display of the mobile computing device, the modified image.

17. The computer-implemented method of claim 16, further comprising:

performing, at the mobile computing device, OCR for the entire image when the degree of OCR complexity is less than a first OCR complexity threshold, wherein the first OCR complexity threshold represents a degree of OCR complexity that the mobile computing device is appropriate for performing itself; and transmitting, from the mobile computing device to the first server, at least the portion of the image when the degree of OCR complexity is greater than the first OCR complexity threshold.

18. The computer-implemented method of claim 17, further comprising:

transmitting, from the mobile computing device to the first server, all of the image when the degree of OCR complexity is greater than a second OCR complexity threshold that is greater than the first OCR complexity threshold, wherein the second OCR complexity threshold represents a degree of OCR complexity that the mobile computing device is not appropriate for performing itself, and wherein when the degree of OCR complexity is between the first and second OCR complexity thresholds, the mobile computing device performs OCR for a first portion of the image and the mobile computing device transmits a second portion of the image to the first server, the first and second portions of the image collectively forming the entire image.

19. The computer-implemented method of claim 17, wherein the translated OCR text includes first and second portions corresponding to machine language translation by the mobile computing device and the second server, respectively, wherein the modified image includes the first portion of the translated OCR text in place of a corresponding portion of the text, wherein the modified image is displayed while awaiting the second portion of the translated OCR text from the second server, and further comprising:

modifying, at the mobile computing device, the modified image to include the second portion of the translated OCR text in place of a corresponding portion of the text to obtain a further modified image; and outputting, at the display, the further modified image.

20. The computer-implemented method of claim 16, further comprising:

performing, at the mobile computing device, machine language translation for the entire OCR text when the degree of translation complexity is less than a first translation complexity threshold, wherein the first translation complexity threshold represents a degree of translation complexity that the mobile computing device is appropriate for performing itself; and transmitting, from the mobile computing device to the second server, at least the portion of the OCR text when the degree of translation complexity is greater than the first translation complexity threshold.

21. The computer-implemented method of claim 20, further comprising:

transmitting, from the mobile computing device to the second server, all of the OCR text when the degree of translation complexity is greater than a second translation complexity threshold that is greater than the first translation complexity threshold, wherein the second translation complexity threshold represents a degree of translation complexity that the mobile computing device is not appropriate for performing itself, and wherein when the degree of translation complexity is between the first and second translation complexity thresholds, the mobile computing device performs machine language translation for a first portion of the OCR text and the mobile computing device transmits a second portion of the OCR text to the second server, the first and second portions of the OCR text collectively forming the entire OCR text.

22. The computer-implemented method of claim 16, wherein determining whether to translate the OCR text from the source language to the target language includes determining whether the source language is a preferred language of a user associated with the mobile computing device.

23. A computer-implemented method, comprising:

during an image capture mode, receiving, at a mobile computing device having one or more processors, an image capture request;

in response to the image capture request:

capturing, at the mobile computing device, an image of an object comprising a text in a source language;

obtaining, at the mobile computing device, the text; and determining, at the mobile computing device, the source language of the text;

in response to the image capture request and determining the source language of the text, determining, at the mobile computing device, whether to translate the text to a different target language; and in response to determining to translate the text to the target language:

determining, at the mobile computing device, a degree of translation complexity for performing machine language translation of the text from the source language to the target language;

transmitting, from the mobile computing device to a server, at least a portion of the text based on the degree of translation complexity;

receiving, at the mobile computing device from the server, machine language translation results;

obtaining, at the mobile computing device, a translated text based on the machine language translation results;

obtaining, at the mobile computing device, a modified image by modifying (i) the image to replace the text with the translated text and (ii) a styling of the translated text such that its styling differs from a styling of the text; and outputting, at a display of the mobile computing device, the modified image.

24. The computer-implemented method of claim 23, further comprising:

performing, at the mobile computing device, machine language translation for the entire text when the degree of translation complexity is less than a first translation complexity threshold, wherein the first translation complexity threshold represents a degree of translation complexity that the mobile computing device is appropriate for performing itself; and transmitting, from the mobile computing device to the server, at least the portion of the text when the degree of translation complexity is greater than the first translation complexity threshold.

25. The computer-implemented method of claim 24, further comprising transmitting, from the mobile computing device to the server, all of the text when the degree of translation complexity is greater than a second translation complexity threshold that is greater than the first translation complexity threshold, wherein the second translation complexity threshold represents a degree of translation complexity that the mobile computing device is not appropriate for performing itself.

26. The computer-implemented method of claim 25, wherein when the degree of translation complexity is between the first and second translation complexity thresholds, the mobile computing device performs machine language translation for a first portion of the text and the mobile computing device transmits a second portion of the text to the server, the first and second portions of the text collectively forming the entire text.

27. The computer-implemented method of claim 26, wherein machine language translation results for the first portion of the text that are obtained by the mobile computing device are output to the display of the mobile computing device before the machine language translation results for the second portion of the text are received from the server.

\* \* \* \* \*